Dec. 12, 1933.　　　　R. W. OTT　　　　1,938,782
MILLING MACHINE SPINDLE CARRIER
Filed Dec. 26, 1930　　2 Sheets-Sheet 1

Inventor
ROBERT W. OTT
By O. H. K. Parsons
Attorney

Dec. 12, 1933.   R. W. OTT   1,938,782
MILLING MACHINE SPINDLE CARRIER
Filed Dec. 26, 1930   2 Sheets-Sheet 2

Inventor
ROBERT W. OTT
By OHK Parsons
Attorney

Patented Dec. 12, 1933

1,938,782

UNITED STATES PATENT OFFICE

1,938,782

MILLING MACHINE SPINDLE CARRIER

Robert W. Ott, Cincinnati, Ohio

Application December 26, 1930
Serial No. 504,816

7 Claims. (Cl. 90—11)

This invention relates to milling machines and more particularly to an improved spindle carrier therefor.

One of the objects of this invention is to provide an adjustable spindle carrier for a milling machine in which the spindle is adjustably mounted in such a manner as to permit a relatively large range of longitudinal adjustment while at the same time permitting a rigid connection with the drive member in all positions of adjustment.

Another object of this invention is to improve the mounting of an adjustable tool spindle in its carrier, whereby upon adjustment to its outermost position any lateral or longitudinal thrusts imparted thereto, as for instance during a heavy cut will be sufficiently counteracted to prevent any turning movement, and which further will be unaffected by expansion, due to heating, thereby preserving and maintaining its alignment and increasing the accuracy of the work produced thereby.

A further object of this invention is to provide an improved adjustable mounting for the cutter spindle of a milling machine which is simplified in construction, comprising a relatively few number of parts which are simple to adjust.

Other objects and advantages of the present invention should be readily apparent by reference to the following specification considered in conjunction with the accompanying drawings illustrative of one embodiment thereof but it will be understood that any modifications may be made in the specific structural details hereinafter disclosed, within the scope of the appended claims, without departing from or exceeding the spirit of the invention.

Referring to the drawings in which life reference numerals indicate like parts:

Figures 1, 4:
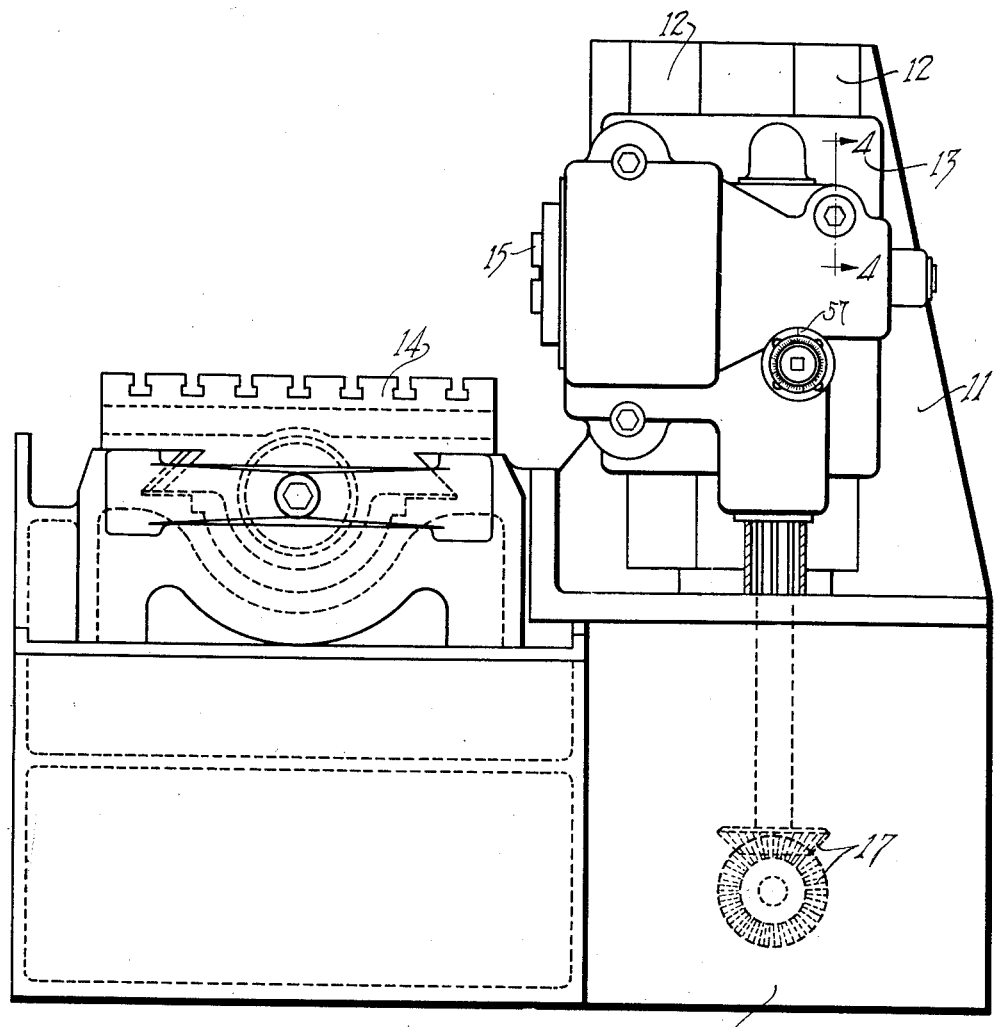
Figure 1 is an elevation of a milling machine embodying the principles of this invention.
Figure 4 is a detail section on the line 4—4 of Figure 1.

The reference numeral 10 indicates the base of a milling machine having a portion 11 uprising therefrom forming a column, upon a vertical face of which, are formed guides 12 for receiving a spindle carrier 13 capable of vertical adjustment thereon. A work table, such as 14, is reciprocably mounted upon the bed 10 for presenting work to a cutter which may be actuated by the cutter spindle 15 journaled in the spindle carrier.

Figure 2:
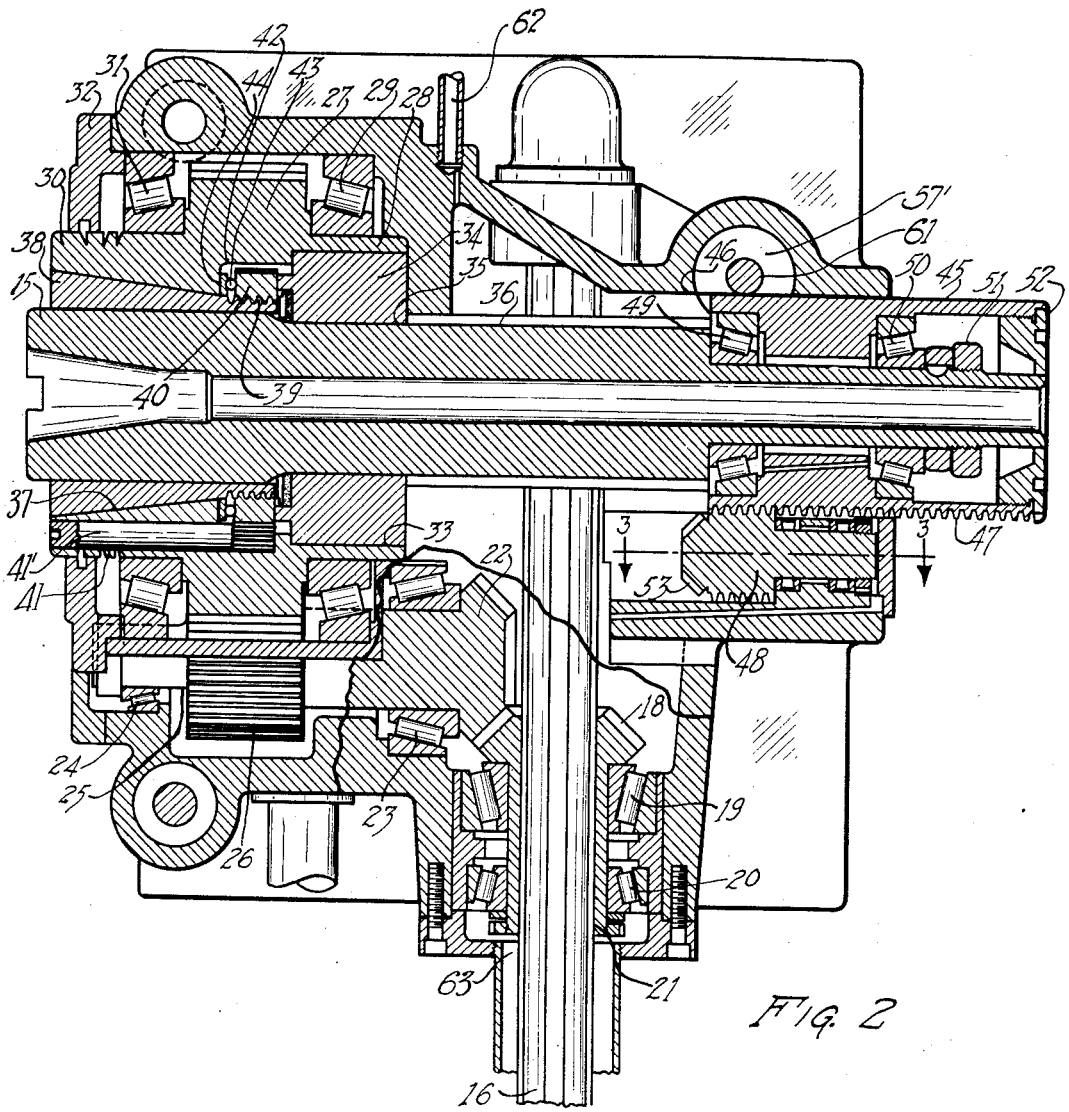
Figure 2 is a detail section through the spindle carrier shown in Figure 1.
Figure 3:
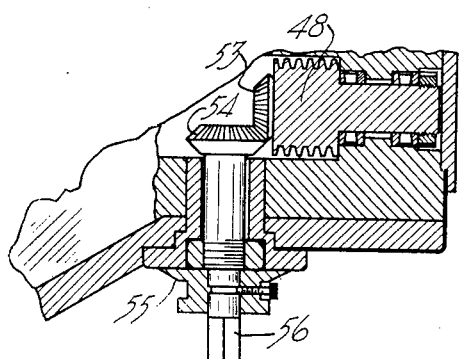
Figure 3 is a detail of the micrometer adjustment as viewed on the line 3—3 of Figure 2.

The construction of the spindle carrier which forms the object of this invention is more particularly shown in Figure 2 to which reference may now be had. A splined shaft, such as 16, serves as the main driving member and may be actuated by suitable power means located in the base of the machine through a transmission, indicated by the beveled gears 17. Attention is invited to the fact that shaft 16 may be fixed in the base 10 against longitudinal movement while still permitting rotative movement.

A beveled gear, such as 18, is journaled in the spindle carrier on anti-friction bearings 19 and 20 and this gear has a splined bore 21 complementary in cross section to the splined shaft 16 forming a driving connection between the two. The construction is such that relative longitudinal movement between the gear and shaft is possible thereby permitting vertical adjustment of the spindle carrier while still maintaining a driving connection with the shaft. A second beveled gear 22 is journaled in the spindle carrier on anti-friction bearings 23 and 24 at right angles to the gear 18 and meshing therewith. The beveled gear 22 has an extended shank 25 which is reduced in diameter to receive the pinion gear 26 integrally fixed therewith. This gear meshes directly with the cutter spindle drive gear 27 which has hubs 28 and 30 projecting from opposite sides thereof, the hub 28 being journaled in the thrust bearing 29 mounted in a fixed part of the spindle carrier and the opposite hub 30 being journaled in the anti-friction bearing 31 held in the carrier by the retainer plate 32. From the construction it is seen that a very simplified drive is provided for the spindle having only two gear contacts resulting in a highly efficient drive with a minimum loss of friction due to gearing.

The hub 28 of the main gear is counter bored at 33 to receive the member 34 which is integrally fixed with the gear 27. This member has a splined bore 35 in which is fitted, for longitudinal adjustment with respect thereto, the splined portion 36 of the cutter spindle 15.

The hub 30 of the drive gear 27 has a tapered bore 37 for receiving a split tapered clamping sleeve or collet 38, the small end of which is exteriorly threaded at 39 for receiving thereon a nut member 40 which serves to draw the clamping sleeves 38 into the tapered bore to effect rigid clamping of the cutter spindle 15 with its drive gear 27 by engaging a thrust bearing 43 interposed between one face of the nut and the wall 44 of the annular groove 42. A plurality of longitudinal bores 41 are formed in the drive gear parallel to the axis thereof and intersecting the annular groove for receiving pinion shafts 41' having pinions on one end engaging the toothed periphery of the nut 40 and wrench receiving sockets formed in the other end whereby the operator may clamp or unclamp the spindle irrespective of the particular position in which it came to rest.

There has thus been provided a splined drive connection between the main drive gear and the cutter spindle which permits longitudinal adjustment of the spindle with respect to the gear and independent means for clamping the spindle with the drive gear after such adjustment thereby insuring a rigid connection between the drive gear and spindle and eliminating any possibility of chatter which might occur if only the tightness of the fit between the bore 35 and the splined section 36 were depended upon.

In order to effect longitudinal adjustment of the spindle, a sleeve member or quill 45 is provided which is slidably mounted in a bore 46 formed in the spindle carrier co-axial with the spindle and provided with a rack portion 47 formed longitudinally thereof which is engaged by a worm gear 48 for effecting longitudinal movement. The sleeve or quill is further provided with thrust bearings 49 and 50 for journaling the other end of the cutter spindle and a lock nut 51 serves to clamp the spindle with the sleeve through the thrust bearings for movement therewith. A cover plate, such as 52, is threaded in the end of the sleeve to protect the moving parts while still permitting access thereto for adjustment purposes.

It will be noted that the bearing group 49—50 is longitudinally spaced from the bearing group 29—31 a considerable distance which makes it possible for lateral thrusts on the spindle nose to be absorbed without disturbing the alignment of the spindle or the cutter actuated thereby. In other words, the leverage of the bearing group 49—50 is considerably greater than the leverage of any force acting on the nose of the spindle which enables such forces to be counteracted with greater facility. It will also be noted that the bearings are so arranged as to give a three point support, the bearing 29 acting as a thrust bearing, as well as a pivot about which the spindle might tend to turn under a lateral thrust, while the bearing 31 and the bearing group 49—50 act to prevent turning while still being capable of counteracting any tendency toward longitudinal movement. This results in a very stable structure without increase in the size or weight of the parts.

The worm gear 48 is journaled in a fixed part of the spindle carrier and has formed integrally on one end thereof a beveled gear portion 53 which meshes with a bevel gear 54 journaled at right angles to the axis of the worm gear. The shank of the gear 54 has secured to its opposite end a dial 55 having indicia marked thereon for indicating the amount of longitudinal adjustment effected in the spindle upon rotation thereof through the application of a wrench to a squared portion 56 of the shank. This dial in conjunction with the fixed mark 57 serves as a micrometer adjustment for the spindle.

Means have been provided for clamping the quill against longitudinal movement and for this purpose a circular bore 57' intersects the bore 46 and has mounted therein the cylindrical clamping blocks 58, 59, each of which has an arcuate clamping face 60 formed on one end thereof. The block 59 is drilled longitudinally for passing a bolt 61 therethrough into threaded engagement with the block 58 whereby tightening of the bolt will draw the faces 60 of the blocks into clamping engagement with the surface of the quill preventing movement thereof while untightening of the bolt will release the quill for adjustment. It is, of course, apparent that the arcuate faces 60 engaging the surface of the quill will prevent rotation of the blocks during rotation of the bolt.

The moving parts in the carrier are lubricated by means of a supply channel 62 which may be connected to any suitable source of lubricant supply. This channel being directly over the spindle the lubricant will fall by gravity thereon and rotation of the spindle will then cause the oil to be whirled about creating an oily mist in the interior of the carrier which will carry the lubricant to all the moving parts. After spending its force the lubricant will fall to the bottom of the carrier, flowing through bearings 19 and 20 to lubricate the same and thence to the outlet 63.

It should now be evident that a spindle carrier has been provided which is composed of a few simple parts without sacrificing rigidity of drive or stability of construction. The arrangement also permits of easy and quick adjustment of the spindle with micrometer accuracy to the end that an improved spindle carrier has been made available which is suitable for general machine tool use.

That which is claimed is:

1. A spindle carrier for a milling machine having a driving member anti-frictionally journaled in one end of said carrier, a cutter spindle mounted co-axially of said drive member and having a splined driving connection therewith, a tapered bore formed in the hub of said drive member, a split bushing mounted in said bore and circumscribing the spindle, and means to effect longitudinal movement of the bushing to rigidly clamp the spindle with the drive gear, and manual means for actuating the clamping means.

2. A housing for the cutter spindle of a machine tool having anti-friction bearings in one end thereof, a spindle drive gear journaled in said bearings, said gear having an axial bore receiving a cutter spindle, a splined driving connection between the gear and spindle permitting relative axial movement between the parts, and means to rigidly clamp the spindle to the gear to prevent relative movement comprising a collet interposed between gear and spindle, means on the end of the collet acting through a thrust bearing to cause clamping thereof, and a bore in said gear parallel to the axis thereof for the insertion of an actuator for said means.

3. A spindle carrier for a machine tool comprising a housing, a driving member journaled therein and having a splined bore, a cutter spindle mounted in the bore for rotation with the member, a hub projecting from said member and having a tapered bore terminating in an enlarged annular groove interior of said member, a split bushing mounted in said bore and projecting into said annular space, a nut threaded on the end of said bushing, a thrust bearing interposed between the nut and a wall of said space whereby upon rotation of the nut, the latter will act through the thrust bearing to draw the bushing in frictional clamping engagement with the spindle and its driver.

4. A spindle carrier for a milling machine comprising a cutter spindle, a drive gear journaled in the carrier and supporting one end of the spindle, an adjustable quill rotatably supporting the opposite end of the spindle, said gear having a tapered bore in one face terminating in an annular recess forming a shoulder, a worm and rack for actuating the quill to effect axial adjustment of the spindle with respect to the driving gear, a collet mounted in the tapered bore and having one end projecting into said annular recess, a nut having a toothed periphery threaded on the end of the collet and in engagement with a thrust bearing acting against said shoulder, and an actuator extending from the exterior face of the driving gear to the annular recess and engaging the toothed periphery of the nut for clamping the collet after longitudinal adjustment of the spindle.

5. A spindle carrier for a milling machine having an anti-friction bearing fixed in one end thereof, a driving member journaled in said bearing, said carrier having a bore formed in the other end thereof in spaced relation to said bearing and in axial alignment therewith, a cutter spindle extending coaxially of the driving member and operatively coupled therewith, said spindle having an unsupported length projecting into said bore, a quill slidably mounted in the bore, means coupling the quill to the end of said spindle for movement thereby, means to axially adjust the quill and thereby the spindle including a rack formed longitudinally of the quill, a worm gear engaging said rack, means to rotate said gear to effect longitudinal adjustment of the quill and spindle, and an indicator associated with said rotating means for determining the amount of spindle movement.

6. A spindle carrier for a milling machine comprising a hollow housing having a front wall, a first anti-friction bearing supported by said wall, a cutter spindle journaled at the nose in said bearing, an intermediate rib portion formed in said housing, a second bearing axially positioned by said rib, a driving member for said spindle positioned between said bearings, said housing having a rear wall, a third bearing structure supported in said rear wall and fixed with the spindle for joint axial movement, manually actuable rack and pinion means for effecting axial adjustment of the spindle, and means to securely clamp the spindle to said driving member after adjustment.

7. In a milling machine having a bed and a table reciprocably mounted thereon, the combination of means for supporting a cutter spindle for movement transversely of the table comprising a hollow housing supported by the bed, a rotatable cutter spindle mounted in the housing, a front bearing and an intermediate bearing carried by the housing, a driving member for the spindle intermediate the bearings and supported thereby, said driving member having a splined bore for receiving the spindle, a third bearing structure supported by the rear wall of said housing, said bearing structure being fixed to one end of said spindle for joint axial movement therewith, manually actuated means for effecting axial movement of the spindle relative to its driving member and thereby with respect to the table, and means to rigidly clamp the spindle to the driving member after adjustment.

ROBERT W. OTT.